United States Patent
Perez

[11] Patent Number: 5,862,833
[45] Date of Patent: Jan. 26, 1999

[54] DISTRIBUTION VALVE FOR HIGH PRESSURE COOLANT USED IN A METALWORKING MACHINE APPLICATION

[75] Inventor: Frederick W. Perez, San Clemente, Calif.

[73] Assignee: Mike Kenney Tool, Inc., Brea, Calif.

[21] Appl. No.: 864,226

[22] Filed: May 28, 1997

Related U.S. Application Data

[63] Continuation-in-part of Ser. No. 562,011, Nov. 22, 1995, abandoned.

[51] Int. Cl.$^6$ ......................................................... F16K 11/06
[52] U.S. Cl. ........................................ 137/625.11; 251/174
[58] Field of Search ........................... 137/625.11, 625.46, 137/580; 251/172, 174, 180, 283; 82/159

[56] References Cited

U.S. PATENT DOCUMENTS

| | | | |
|---|---|---|---|
| 2,312,601 | 3/1943 | Stillwagon, Jr. | 137/625.11 |
| 2,377,473 | 6/1945 | Wolcott | 137/625.11 |
| 2,772,848 | 12/1956 | Holzer et al. | 251/172 X |
| 2,925,095 | 2/1960 | Bates | 251/283 X |
| 2,963,261 | 12/1960 | Holl | 251/172 |
| 2,974,681 | 3/1961 | Whitehurst | 137/625.11 X |
| 2,990,853 | 7/1961 | Sharp | 251/283 X |
| 3,076,478 | 2/1963 | Winders | 137/625.11 |
| 3,556,151 | 1/1971 | Masuda | 251/172 X |
| 3,972,350 | 8/1976 | Pickett | 137/625.11 X |
| 4,006,518 | 2/1977 | Rudolph et al. | 82/159 |
| 4,506,693 | 3/1985 | Acker | 251/172 X |
| 4,632,148 | 12/1986 | Stark Sr. et al. | 137/625.11 X |
| 4,778,148 | 10/1988 | Kruger | 251/283 X |
| 4,793,591 | 12/1988 | Decker et al. | 251/172 |
| 5,107,895 | 4/1992 | Pattison et al. | 137/625.11 |
| 5,193,581 | 3/1993 | Shiroto et al. | 137/625.11 |

*Primary Examiner*—John Rivell
*Attorney, Agent, or Firm*—Christie, Parker & Hale, LLP

[57] ABSTRACT

A distribution valve for directing high pressure coolant to various stations of a metalworking machine or similar device. A hollow shaft directs high pressure fluid to an aperture in a seal plate. The aperture is selectively coupled to one of several seals mounted in a housing. Each seal is formed with an axial passageway for directing fluid to its respective station when aligned with the aperture. A biasing means holds the seal against the seal plate to provide a leak free interface.

21 Claims, 9 Drawing Sheets

DISTRIBUTION VALVE FOR HIGH PRESSURE COOLANT USED IN A METALWORKING MACHINE APPLICATION

CROSS-REFERENCE TO RELATED APPLICATION

This is a continuation-in-part of application Ser. No. 08/562,011, filed Nov. 22, 1995, abandoned.

FIELD OF THE INVENTION

This invention relates to rotary distribution valves and more specifically to a valve that can be used to direct high pressure coolant to various stations of a metalworking machine or similar device.

BACKGROUND OF THE INVENTION

In recent years the use of high pressure coolants in metalworking machinery has proven to be useful in increasing production efficiency and finishes of machined parts. High pressure hydraulic fluids and high pressure fluid systems in general have relied upon the use of various valves and valving techniques for the distribution of the high pressure fluids to various components. These valves variously called distribution valves, distribution devices, rotary manifolds, and other similar nomenclature employ either elastomer seals as the primary sealing component, or metal to metal sealing elements as their primary dynamic (moving) seal element.

Coolants and most fluids used as cutting oils or lubricants for use in metalworking machines are contaminated or become contaminated with particles of varying sizes. These particulates are either airborne, inherent in the fluid, or generated by wear and corrosion in the systems, in which the fluid flows. In metalworking machines the coolant is contaminated with chips from the material being cut or ground. Most fluid systems employ filtration designed to remove particles of various sizes. No filtration is perfect and consequently particles of metals and corrosion products and other minerals are always present in any flowing medium.

In valves and distribution devices employing elastomeric seals, these particles become trapped or embedded in the elastomer seals or between the seals and the moving components in a dynamic seal, causing wear, cutting and ultimately erosion and destruction of the seal and other components in the system ultimately leading to leakage and failure of the components and possible failure of the system.

In valves and distribution devices employing metal to metal seals, the particles can become trapped in the very small clearances between the sealing surfaces. The larger particles may become trapped as the flow carries these particles over the overlapping edges of the sealing elements and as these edges close on each other, much the same as a scissor closing on an obstruction. Both of these actions will damage the sealing surfaces and again cause failure of the component. Some of the existing methods of sealing employ soft metals such as brass or other copper alloy sealing elements. These devices exhibit similar failure modes as do the elastomer sealed components.

Finally it should be noted that in most prior art distribution valves, the flow passages are reduced in diameter to accommodate the sealing elements.

Accordingly, there is a current need for a valve distribution system which is damage resistant to contaminants in the flow medium.

SUMMARY OF THE INVENTION

The present invention is directed to a valve distribution system that satisfies this need. There is, therefore, provided according to a preferred embodiment of the present invention a rotary distribution valve for high pressure coolant distribution in a metalworking machine comprising a hollow shaft having an inlet and an outlet for directing high pressure coolant therethrough. The hollow shaft is affixed to a seal plate. The seal plate has an aperture coupled to the outlet of the hollow shaft. The aperture is selectively aligned with one of a plurality of seals mounted in a housing for connecting the outlet of the hollow shaft thereto. The seal is formed with an axial passageway having a flat radial surface at one end. Each seal is provided with a biasing means for holding the flat surface in contact with the seal plate.

Preferably, the flat surface of the seal is formed with a raised annular ring for producing a leak-free interface between the axial passageway and the seal plate. The axial passageway may further be constructed with a smaller diameter than the annular ring, thereby forcing the annular ring against the seal plate when coolant is passed therethrough. The biasing means may be a resilient member disposed around the axial passageway of each seal between the housing and the annular ring.

Preferably, the housing and the seal plate are rotatably coupled about a common central axis. In this embodiment, the aperture of the seal plate is offset from the central axis and the seals are radially disposed about the central axis, having a radius substantially equal to the offset of the aperture. Depending on the number of metalworking machine stations, a second set of seals arranged concentrically to the first set may be provided. This embodiment requires a second aperture having an offset from the central axis equal to the radius of the second concentric set of seals.

In one embodiment, the housing remains stationary and the seal plate is rotated to select the appropriate station of the metalworking machine. In another embodiment, the seal plate remains stationary and the housing is rotated.

An attractive feature of an embodiment of the present invention is that the surface of the seal is held in contact with a seal plate at all times and thereby overcomes all the noted problems in prior art distribution valves used in metalworking machine cooling applications. Accordingly, since the sealing surfaces of the seals and the seal plate are never separated, there is no possibility of contamination damaging these critical surfaces. Moreover, the seals wipe the surface of the rotor and scrape any debris clear of the sealing surfaces. As each station is selected and the seal is moved relative to the seal plate, the seal face wipes across the seal plate sweeping contaminants out of its path. The seals allow for a full bore flow path with unrestricted flow of coolant through the valve.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
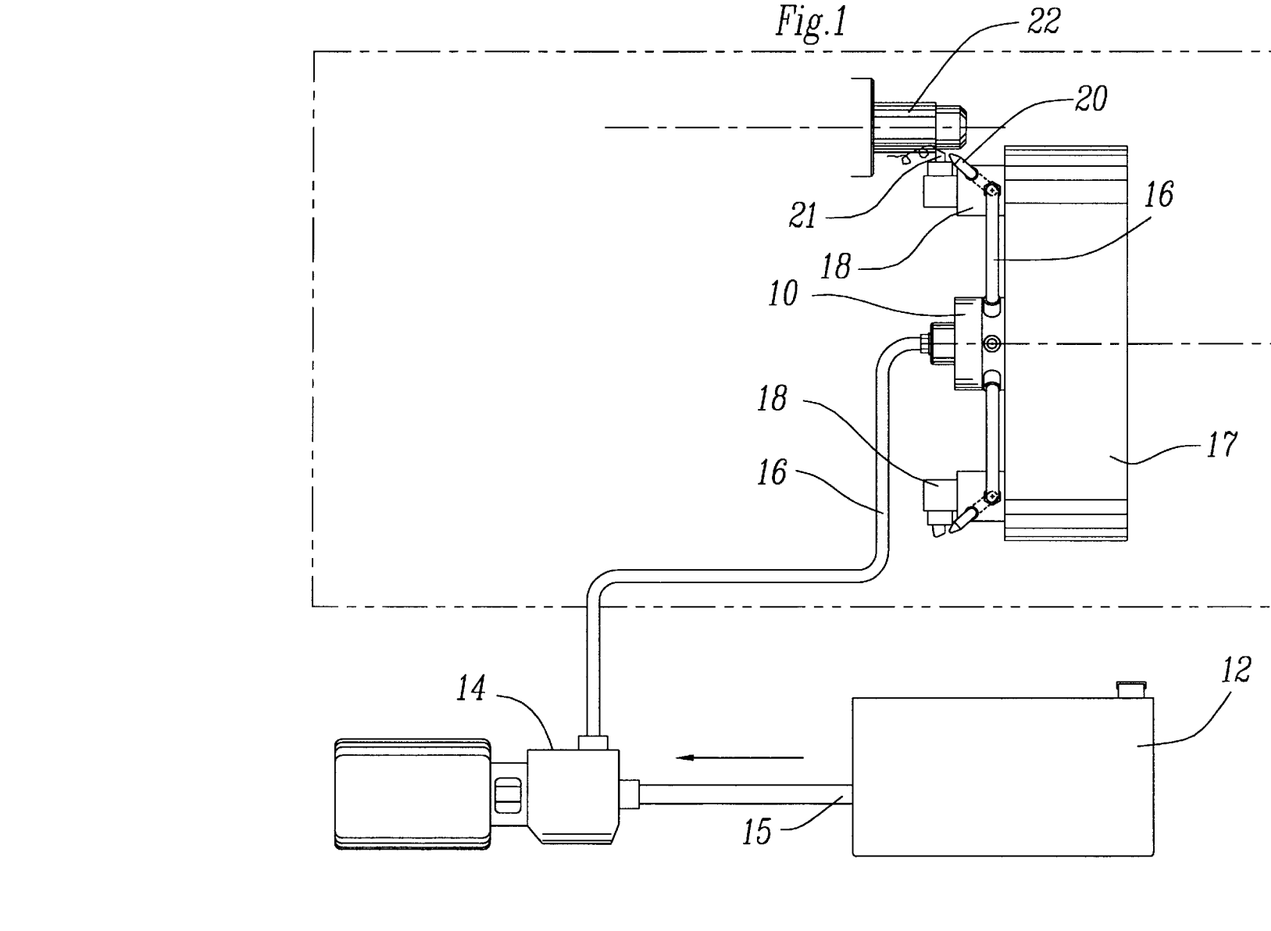
FIG. 1 shows an embodiment of a distribution valve mounted on a metalworking machine (turret lathe) in a typical application.

In a preferred embodiment of the present invention, a distribution valve for high pressure coolant, is shown in FIG. 1, in use in a typical application with a metalworking machine. High pressure coolant is delivered to the metalworking machine 11 from a motor or pump 14 through a flow channel or pipe 16. A holding chamber or reservoir 12 is provided to feed the coolant to the pump 14 via a flow channel 15. The distribution valve 10 is attached to the metalworking machine 11 at any convenient location so that the coolant can be directed to each of the tool stations 18. A coolant nozzle 20 may be provided to convert the high pressure coolant from the tool station 18 to a high velocity jet stream directed at the cutting tool 21 and work piece 22. It will be understood by one having ordinary skill in the art that cutting tools such as boring bars and drill bits that have coolant paths and channels internal to the tool will not require a coolant nozzle.

Referring to FIG. 1, an exemplary metalworking machine is shown as a turret lathe 17. In this embodiment, multiple tool stations 18 are provided for holding tools 21 which are used to cut, shape, and bore holes in the work piece 22. Said tool stations 18 are typically arranged in a circular pattern on the turret 17 with the distribution valve 10 being mounted at the center of the turret.

The coolant serves two primary purposes during the machining operation. The first is cooling the work piece 22 as it is being machined. This requires that the coolant be directed on the work piece in a manner that produces maximum cooling efficiency. Cooling of the work piece and the cutting tool is important in extending the life of the cutting tool and allows the work piece 22 to be machined at a high rate. To accomplish maximum cooling efficiency, the valve used to distribute the coolant to the tool station 18 should be a full flow valve having minimal obstruction to coolant flow.

The second beneficial effect of the coolant flow is the removal of material debris that is generated by the cutting action of the metalworking machine 11 on the work piece 22. Efficient removal of debris from the cutting tool results in a finer finish of the work piece surface, which is highly desirable. The degree of fineness and speed at which the work piece 22 can be machined is a function of the coolant velocity, which in turn is a function of the coolant operating pressure. A preferred embodiment of the present invention allows coolant to be distributed to each of the tool stations 18 at a high pressure, high velocity, and high flow rate without the deleterious effects of these operating conditions on the valve sealing surfaces.

Figure 2:
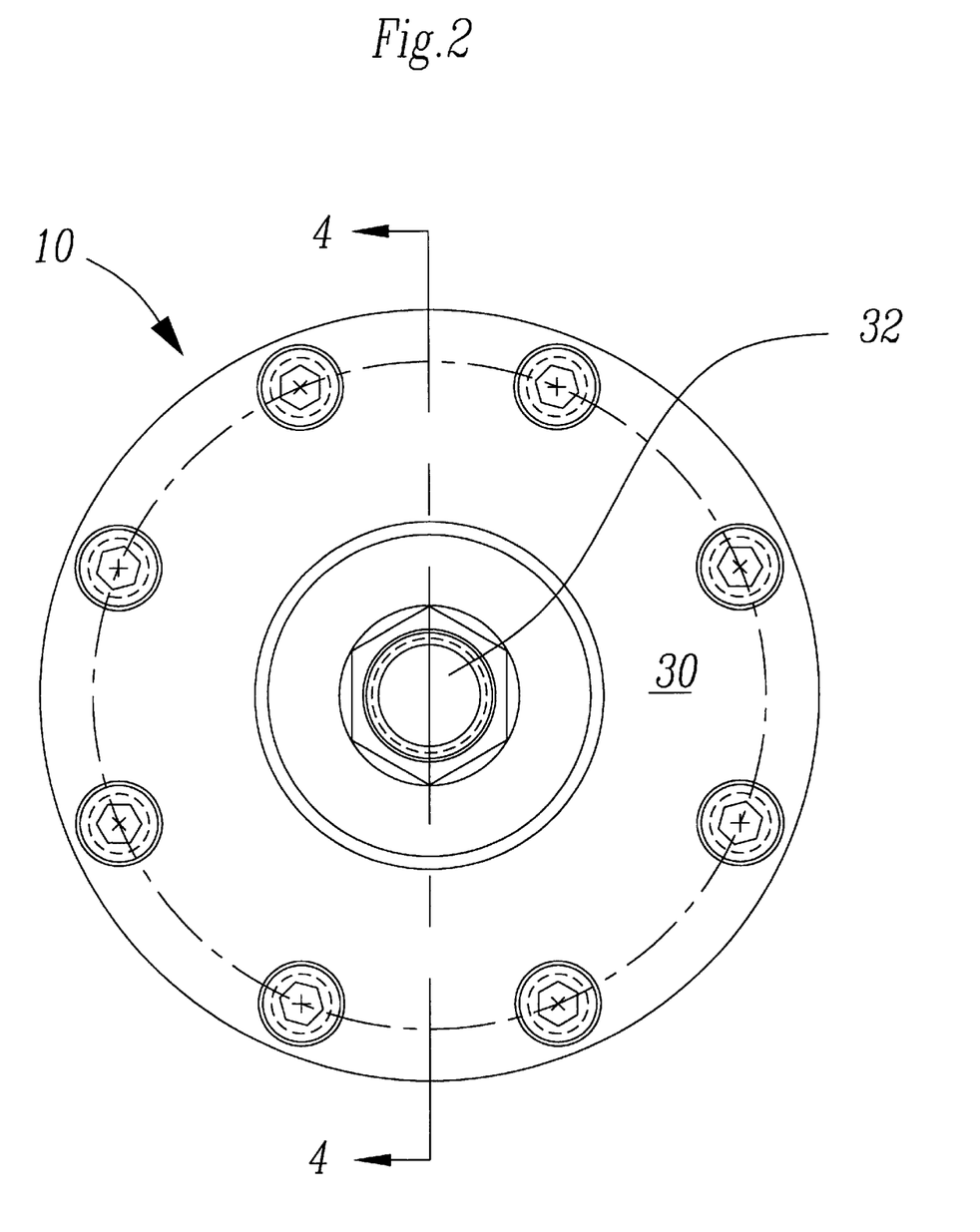
FIG. 2 is a front view of an embodiment of a distribution valve.
Figure 3:
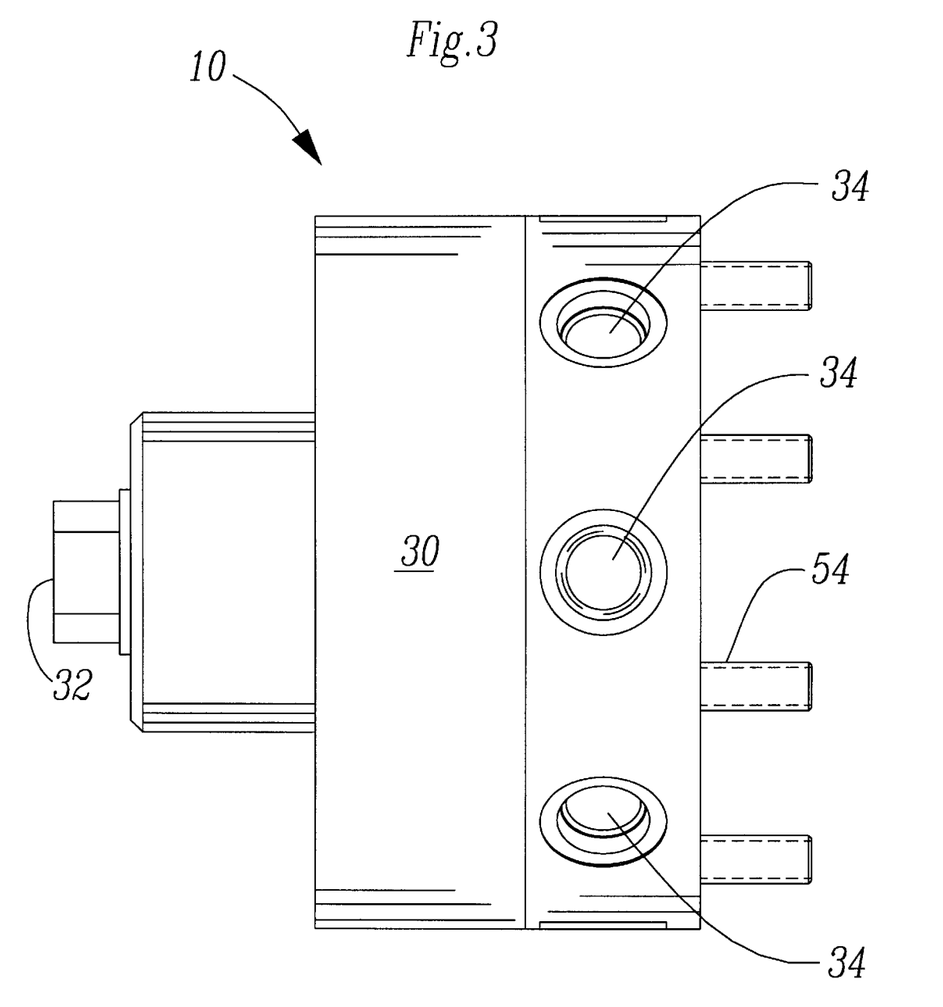
FIG. 3 is a side view of an embodiment of a distribution valve.
Figure 4:
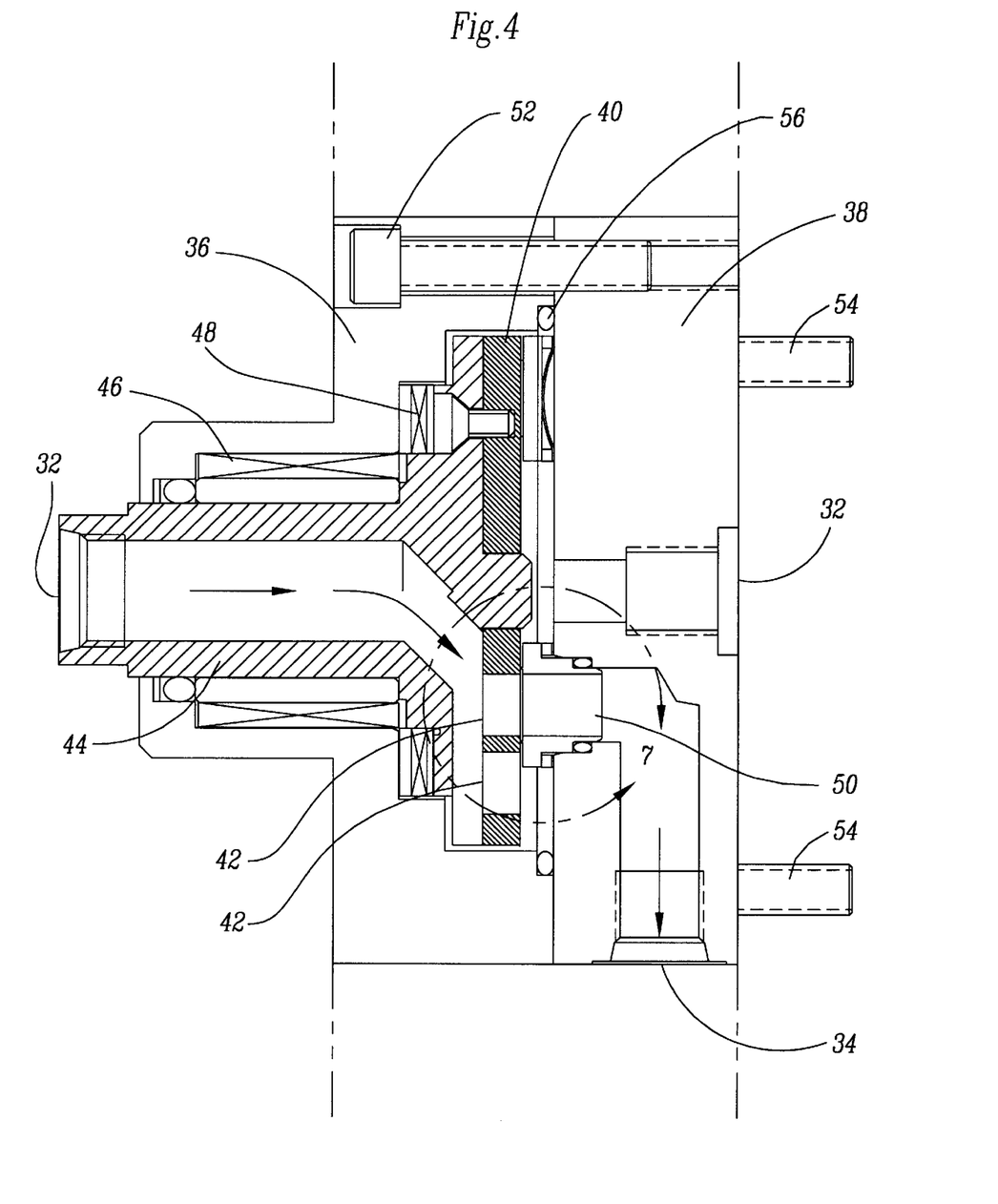
FIG. 4 is a cross-sectional side view of an embodiment of a distribution valve.

Turning to FIGS. 2, 3 and 4, a distribution valve 10 is shown which includes a hollow enclosure 30 with an inlet 32 and various outlets 34 with each outlet being connected to a station of a metalworking machine. In a preferred embodiment, for ease of maintenance and manufacture, the hollow enclosure 30 is made of two mating sections comprising a bonnet 36, and a housing 38, joined by a plurality of bolts 52 threaded into the housing 38. Bolts 54, located in alternating positions to bolts 52, are used for mounting the distribution valve 10 to the metalworking machine. The joint between the bonnet 36 and the housing 38 is sealed with a elastomeric o-ring seal 56.

A circular seal plate 40 is fixed at its center to a hollow shaft 44. The shaft is supported with bearings 46. An aperture 42 is formed in the seal plate 40. The aperture is rotatably aligned with one of a plurality of seals 50 mounted in the housing 38 for passing coolant from the inlet 32 to a selected outlet 34. As the plate 40 is rotated, successive outlets 34 are connected to the inlet 32.

A thrust bearing 48 is used to absorb the axial force of the pressure on the seal plate 40 due to the differential pressure across the seals 50. This differential pressure being the difference between the delivery pressure of the coolant from the pump and atmospheric pressure at each of the seals 50 that are blocked by the seal plate 40.

Figure 5:
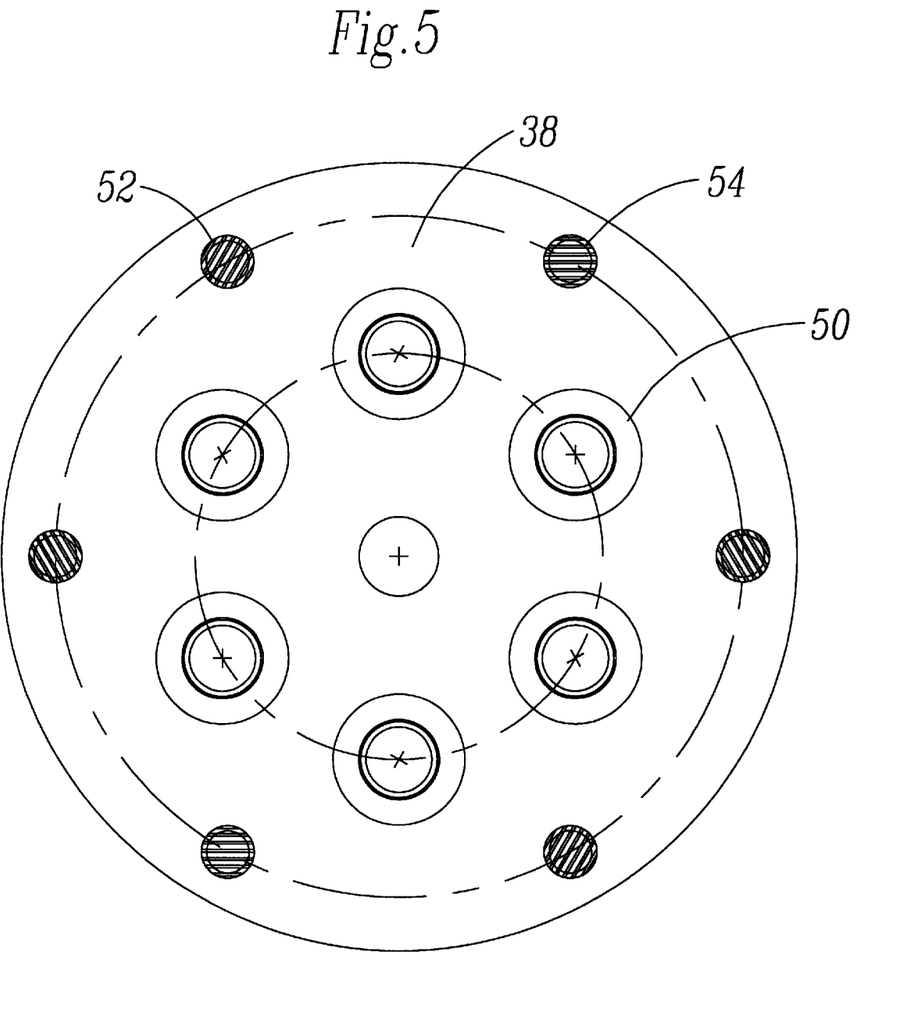
FIG. 5 is a cross-sectional front view of an embodiment of a distribution valve illustrating a seal arrangement for a six outlet valve.
Figure 6:
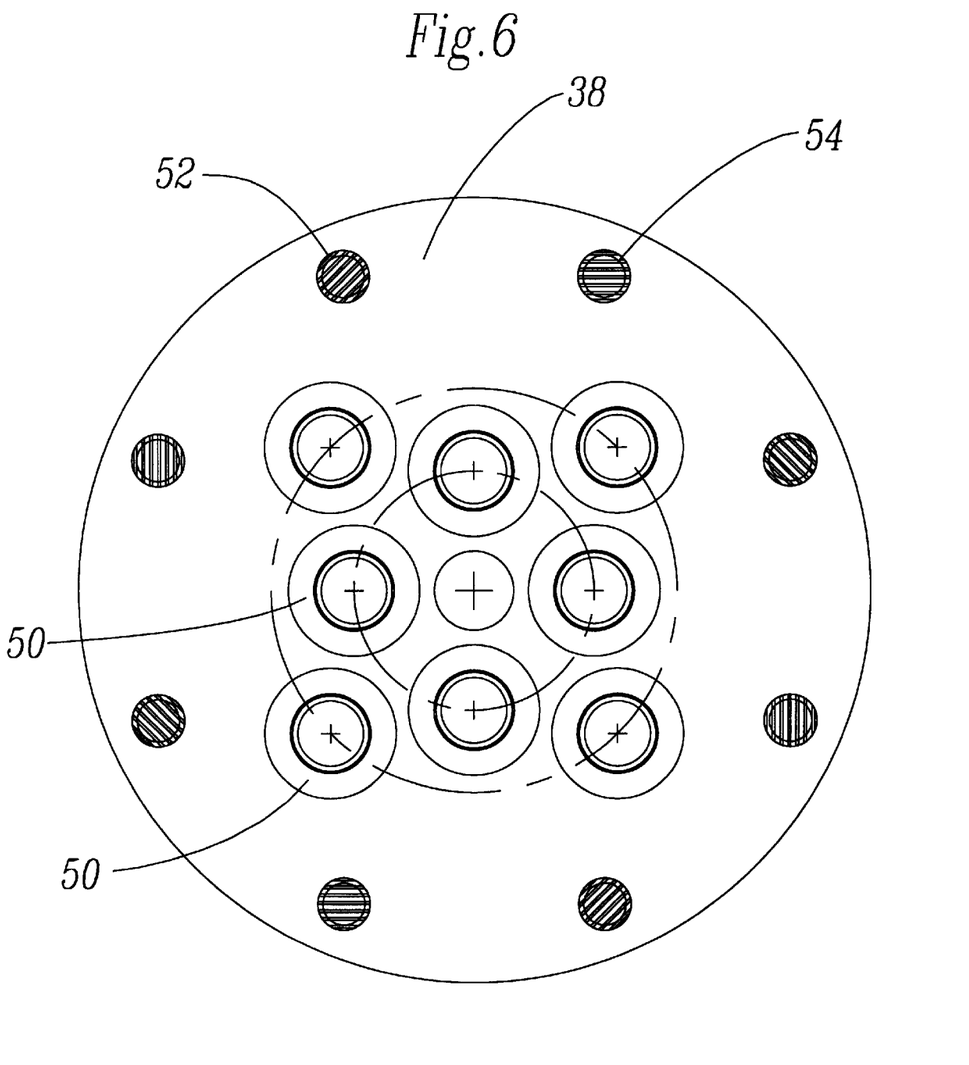
FIG. 6 is a cross-sectional front view of an embodiment of a distribution valve illustrating a seal arrangement for an eight outlet valve.

Referring to FIGS. 5 and 6, differing concentric seal patterns may be employed depending on the number of outlets 34 and the degree of compactness required by the specific application. FIGS. 5 and 6 illustrate seal patterns for a six (6) outlet valve and an eight (8) outlet valve respectively.

While the present embodiment utilizes concentric or circular patterns of seals 50 mounted in a housing 38, it will be understood that other embodiments could use seals having other patterns including linear patterns. The seal plate 40 could also have a square or rectangular cross-section and move in a linear manner rather than rotating.

Other embodiments could have the bonnet 36 mounted to the machine turret with the shaft 44 extended through the turret and coolant flow directed through the hollow shaft as shown in FIG. 4. Another configuration could be a solid fixed shaft and the housing attached to a rotatable turret, with flow directed through a channel to the alternate inlet 32 as shown in FIG. 4.

Figure 7:
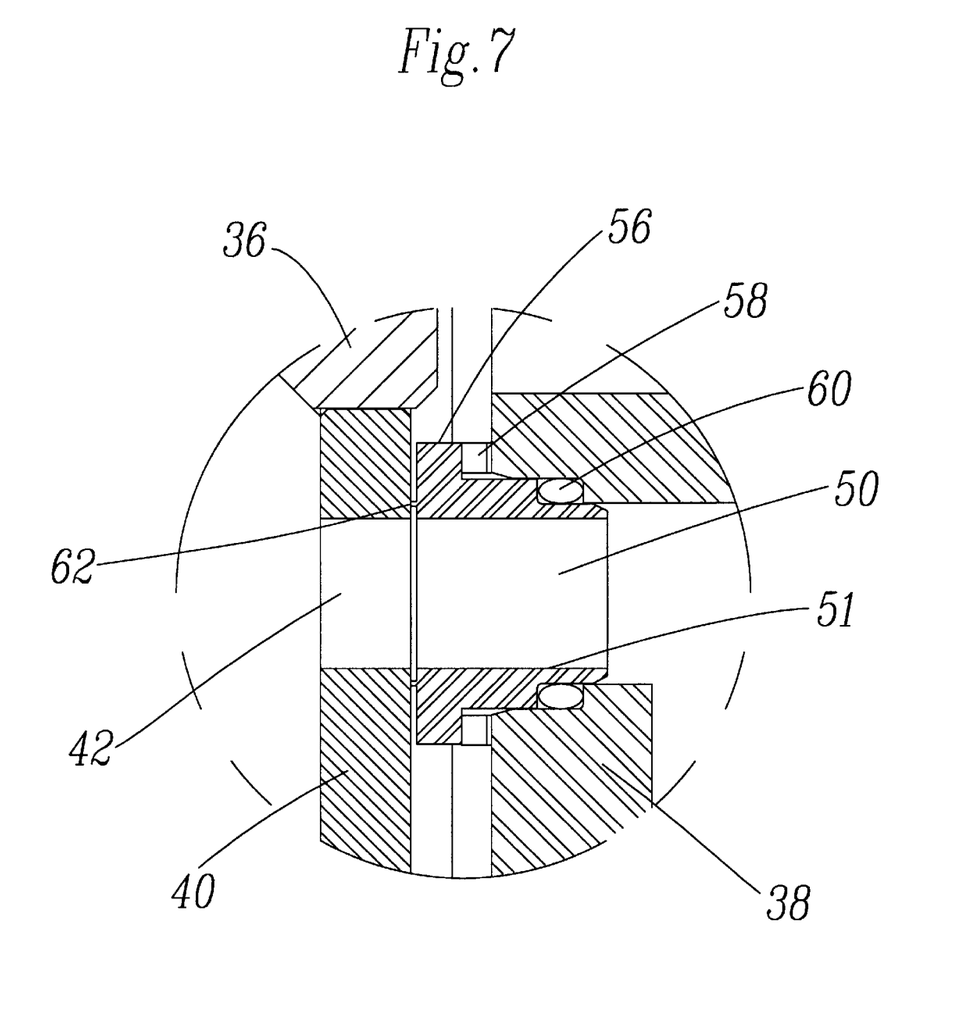
FIG. 7 is an enlarged cross-section of an embodiment of a distribution valve illustrating the seal plate aligned with a seal.
Figure 8:
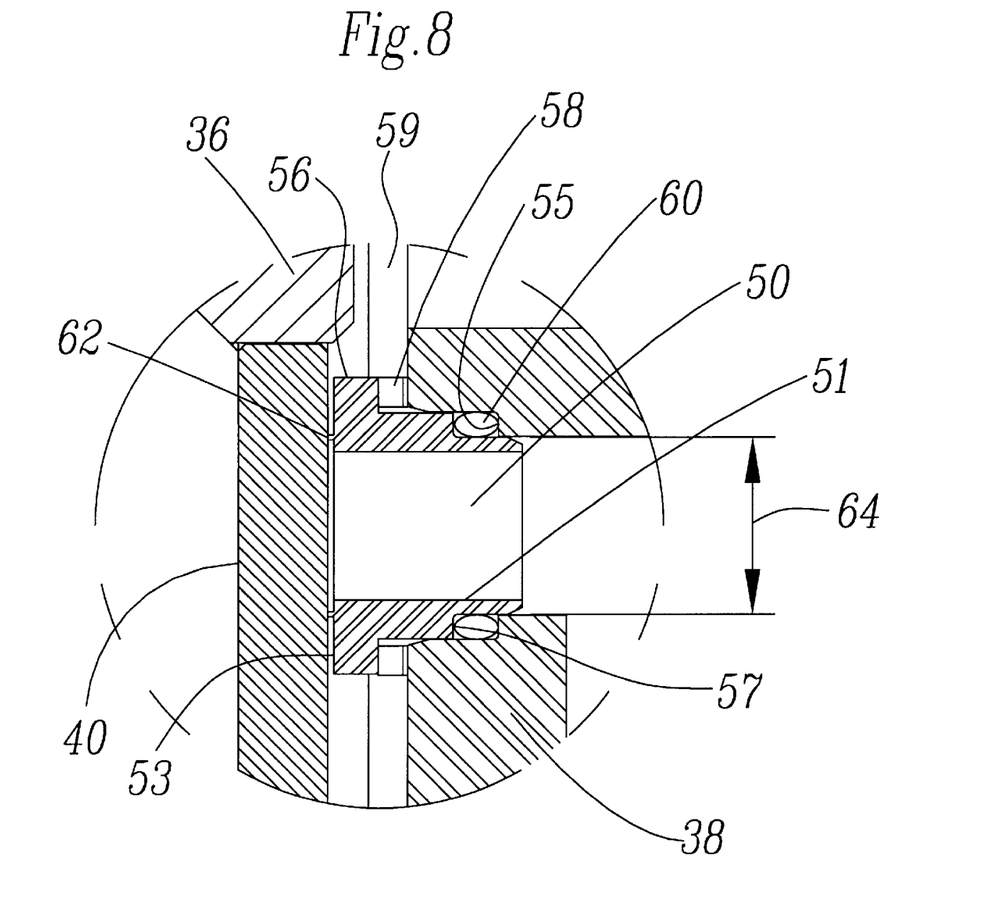
FIG. 8 is an enlarged cross-section view of an embodiment of a distribution value illustrating the seal and seal plate orientation with the flow path blocked and the seal plate in the closed position.

The operation of the seal 50 is best understood by reference to FIGS. 7 and 8. The seal 50 consists of a generally cylindrical seal body 51, a spring 58, and a elastomeric o-ring seal 60. Seal body 51 has a face 53 spaced closely from seal plate 40, an annular flange 56, and an annular shoulder 57. Housing 38 has an annular shoulder 55 adjacent to shoulder 57. Shoulders 57 and 55 form a groove that retains o-ring seal 60. Preferably, the spring 58 is a circular wave spring that is compressed between the seal flange 56 and the housing 38. Other embodiments could include the use of conventional coiled wire compression springs or any other means known in the art. The function of the spring 58 is to assure that the seal body 51 is in contact with the seal plate 40 when the coolant is de-pressurized. The seal 50 has formed on the face 53 of the seal body 51 a raised annular ring 62. Preferably, the spring 58 is a circular wave spring that is compressed between the seal flange 56 and the housing 38. Other embodiments could include the use of conventional coiled wire compression springs or any other means known in the art. The function of the spring 58 is to assure that the seal body 51 is in contact with the seal plate 40 when the coolant is de-pressurized. The seal 50 has formed on the face 52 of the seal body 51 a raised annular ring 62 that is of such flatness and finish corresponding to the flatness and finish of the plate 40 that a leak free interface is produced between the facing surfaces of seal plate 40 and seal 50. The required flatness of the seal plate surface and the raised annular ring of the seal is measured in helium light bands or wave lengths of helium light and should be typically less than 4 helium light bands. This degree of flatness can be achieved by flat lapping both the seal plate 40 and the annular ring 62 of the seal 50.

Figure 9:
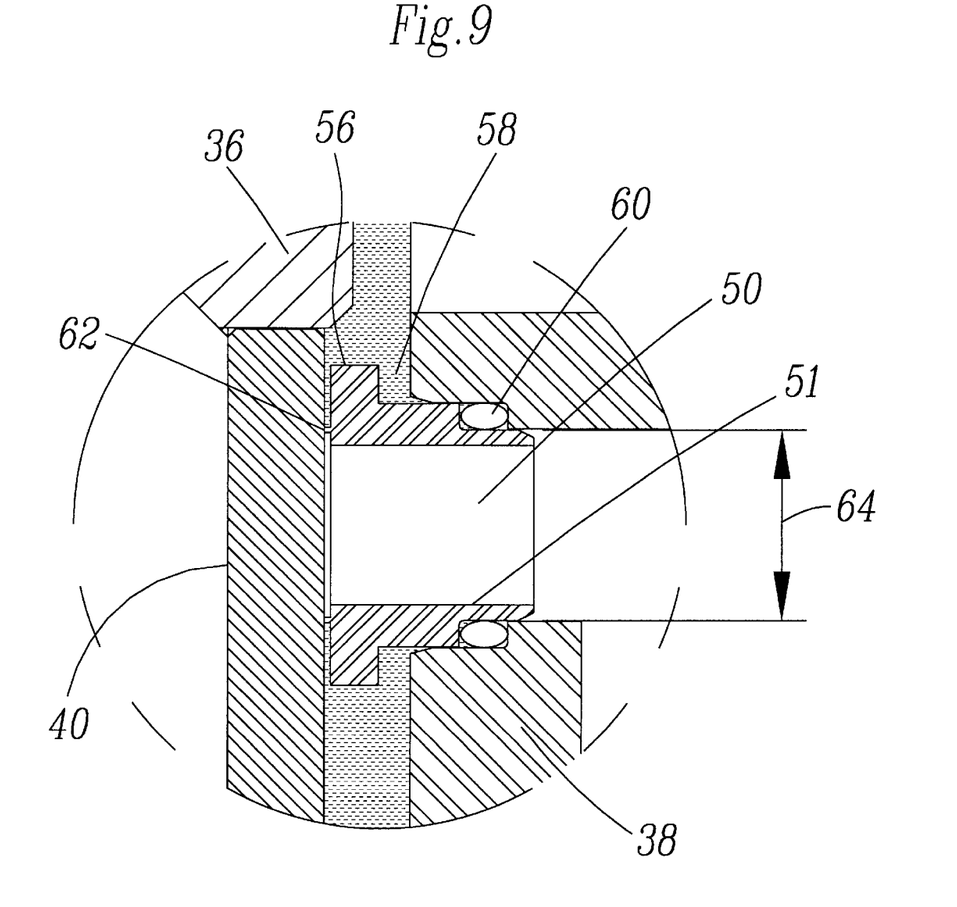
FIG. 9 is the cross-section of FIG. 8 marked in black to show the surfaces against which the upstream fluid pressure is exerted.

The fluid in the space 59 between seal plate 40 and housing 38 is at the high line pressure. When the valve is open as shown in FIG. 7, the same fluid pressure is exerted on all the surfaces of seal body 51, namely the high delivery pressure. But when the valve is closed as shown in FIG. 8, a low pressure is exerted on the surfaces inside the passage of seal body 51, including the area of face 53 inside the annular ring 62 and on the area of seal body 51 downstream of o-ring seal 60, while the high delivery pressure is exerted on the other surfaces of seal body 51, including the area outside the annular ring 62 on face 53, the downstream side of flange 56, and the annular surface of shoulder 57. The surfaces against which the high delivery pressure is exerted are shown in black in FIG. 9. By properly designing the areas of seal body 51, the forces created by the pressure difference can be balanced to insure closure of the valve without undue wear on the sealing surfaces.

In a preferred embodiment, the balance of pressure forces are maintained by controlling the diameter of the annular ring 62 and its relationship to the inside diameter of shoulder 57. Ideally, the diameter of the annular ring 62 should be exactly the same as the inside diameter of the shoulder 57 so that the pressure forces developed on the seal 50 cancel. This feature is particularly attractive in high pressure coolant systems to minimize the torque required to rotate the valve and reduce the wear on the seal. As a practical matter, however the diameter of the annular ring 62 and the inside diameter of the shoulder cannot be controlled with such exacting tolerances. Accordingly, it is desirable to manufacture the inside diameter of shoulder 57 to be slightly less than the annular ring 62 diameter of the seal, such that the force on the seal face, while always acting to keep the seal in contact with the seal plate, does not increase too greatly with increased coolant pressure.

In a preferred embodiment, the balance of pressure forces are maintained by controlling the diameter of the annular ring 62 and its relationship to the inside diameter of shoulder 54. Ideally, the diameter of the annular ring 62 should be exactly the same as the inside diameter of the shoulder 54 so that the pressure forces developed on the seal 50 cancel. This feature is particularly attractive in high pressure coolant systems to minimize the torque required to rotate the valve and reduce the wear on the seal.

As a practical matter, however, the diameter of the annular ring 62 and the inside diameter of the shoulder cannot be controlled with such exacting tolerances. Accordingly, it is desirable to manufacture the inside diameter of shoulder 54 to be slightly be less than the annular ring 62 diameter of the seal, such that the force on the seal face, while always acting to keep the seal in contact with the seal plate, does not increase too greatly with increased coolant pressure. It is this seal condition that permits the distribution valve of the present invention to operate with great efficiency and overcome prior art problems.

In operation, in association with a metalworking machine, the above described distribution valve would be activated each time the metalworking machine would select a new active tool station, at which time the turret to which the distribution valve is attached would rotate carrying with it the seals which are fixed thereto. The valve shaft 44 is fixed as is the attached seal plate 40. Thus the next station would rotate into position over the aperture 42 allowing coolant to flow to the tool station and all other stations would be sealed as shown in FIG. 8.

Both seal plate 40 and seals 50 are made from a hard material. Preferably, seal plate 40 is harder than seals 50, i.e. about 10 points more on the Rockwell hardness scale, so that any wear occurs with respect to seals 50 rather than seal plate 40 because the former is easier and cheaper to replace than the latter.

It is apparent from the foregoing that the present invention satisfies an immediate need for a distribution valve that is damage resistance to contaminants in the flow medium. The present invention satisfies this need by providing a rotary distribution valve having a seal held into contact with a seal plate. This distribution valve may be embodied in other specific forms and used for a variety of devices without departing from the spirit or essential attributes of the present invention. It is therefore desired that the present embodiment be considered in all respects as illustrative and not restrictive, reference being made to the appended claims rather than the foregoing description to indicate the scope of the invention.

What is claimed is:

1. A distribution valve for high pressure coolant distribution in a metalworking machine comprising:
    a hollow shaft having an inlet and an outlet for passing a high pressure coolant therethrough;
    a seal plate affixed to said hollow shaft, said seal plate having an aperture coupled to the outlet of said hollow shaft; and
    a housing having a plurality of seals, each of said plurality of seals comprising an axial passageway, a flat radial surface at one end with a raised annular ring for producing a leak free interface between the axial passageway and the seal plate, and an annular shoulder adjacent an opposing end, said raised annular ring having a diameter substantially the same as an inside diameter of said annular shoulder.

2. The distribution valve of claim 1 further comprising a resilient member disposed around an exterior of said axial passageway interposed between said housing and said annular ring for biasing the flat surface toward the seal plate.

3. The distribution valve of claim 2 wherein said housing and said seal plate have a common central axis, said aperture of said seal plate being offset from said central axis and said plurality of seals being radially disposed about said common central axis wherein the radius of each of said plurality of seals is substantially equal to the offset of said aperture from said common central axis.

4. The distribution valve of claim 3 wherein said seal plate is rotatable about said common central axis for rotatably aligning one of said plurality of seals of said housing with the aperture of said seal plate.

5. The distribution valve of claim 1 wherein said housing is rotatable about said common central axis for rotatably aligning one of said plurality of seals of said housing with said aperture of said seal plate.

6. The distribution valve of claim 1 wherein said seal plate further comprises a second aperture having a different offset from said common central axis than said aperture, and said housing further comprises a second plurality of seals concentrically arranged with said plurality of seals wherein the radius of each of said second plurality of seals is substantially equal to the offset of said second aperture from said common central axis.

7. The distribution valve of claim 5 further comprising a bonnet connected to said housing for directing said high pressure coolant from the outlet of said hollow shaft to the aperture of said seal plate.

8. The distribution valve of claim 5 wherein said housing further comprises an output for each of said plurality of seals for passing high pressure coolant to a station of said metalworking machine when the respective seal is aligned with the aperture of said seal plate.

9. A distribution valve for high pressure coolant distribution in a metalworking machine comprising:
   a housing having a plurality of seals radially disposed about a central axis of said housing, each of said plurality of seals having an axial portion for passing said high pressure coolant therethrough, an annular flange formed with a raised annular ring at one end and an annular shoulder adjacent an opposing end said annular ring having a diameter substantially the same as an inside diameter of the annular shoulder; and
   a seal plate rotatably coupled about a common central axis with said housing, said seal plate having an aperture offset from said central axis by a distance substantially equal to the radius of said radially disposed plurality of seals for rotatably connecting one of said plurality of seals to a high pressure coolant source.

10. The distribution valve of claim 1 further comprising a resilient member for each of said plurality of seals, said resilient member being disposed around an exterior of said axial portion interposed between said housing and said annular flange for biasing said annular ring against said seal plate.

11. The distribution valve of claim 9 wherein one of said housing and said seal plate is rotatable about the common central axis for rotatably aligning one of said plurality of seals of said housing with said aperture of said seal plate.

12. The distribution valve of claim 9 wherein said seal plate further comprises a second aperture having a different offset from said common central axis than said aperture, and said housing further comprises a second plurality of seals concentrically arranged with said plurality of seals wherein the radius of each of said second plurality of seals is substantially equal to the offset of said second aperture from said common central axis.

13. A distribution valve having an inlet and a plurality of outlets for communicating between a high pressure coolant source and a station of a metalworking machine comprising:
   a seal plate having an aperture coupled to said inlet;
   a housing having a plurality of seals connected respectively to said plurality of outlets, each of said plurality of seals comprising an axial passageway, a flat radial surface with a raised annular ring at one end for producing a leak free interface between the flat radial surface and the seal plate, and an annular shoulder adjacent an opposing end, said raised annular ring having a diameter substantially the same as an inside diameter of the annular shoulder, said housing being movably coupled to said seal plate for selectively connecting said high pressure coolant source to one of said stations of said metalworking machine.

14. The distribution valve of claim 11 further comprising a resilient member for each of said plurality of seals, said resilient member being disposed around an exterior of said axial passageway interposed between said housing and said annular ring for holding the flat surface in contact with the seal plate.

15. The distribution valve of claim 13 wherein said housing and said seal plate have a common central axis, said aperture of said seal plate being offset from said central axis and said plurality of seals being radially disposed about said common central axis wherein the radius of each of said plurality of seals is substantially equal to the offset of said aperture from said common central axis.

16. The distribution valve of claim 13 wherein said seal plate further comprises a second aperture having a different offset from said common central axis than said aperture, and said housing further comprises a second plurality of seals concentrically arranged with said plurality of seals wherein the radius of each of said second plurality of seals is substantially equal to the offset of said second aperture from said common central axis.

17. The distribution valve of claim 13, in which the seals are made from a material that is harder than the seal plate.

18. The distribution valve of claim 15 wherein the inside diameter of the annular shoulder is slightly less than the diameter of the raised annular ring.

19. The distribution valve of claim 15 wherein the inside diameter of the annular shoulder is slightly less than the diameter of the raised annular ring.

20. The distribution valve of claim 15 wherein the inside diameter of the annular shoulder is slightly less than the diameter of the raised annular ring.

21. A high pressure valve for opening and closing a flow path comprising:
   a seal plate having a flat first sealing surface and a first fluid passage having a first opening in the first sealing surface;
   a seal body having a face spaced closely from the first sealing surface, the face having a flat annular second sealing surface and a second fluid passage having a second opening in the face surrounded by the second sealing surface;
   a housing in which the seal body is movably mounted;
   a first annular shoulder formed on the seal body around the second passage, the first shoulder having an inner diameter that is smaller than the diameter of the second sealing surface;
   a second annular shoulder formed on the housing adjacent to the first shoulder such that the first and second shoulders form an O-ring retaining groove;
   an O-ring disposed in the groove to seal the interface between the housing and the seal body;
   means for urging the seal body toward the seal plate so the first and second sealing surfaces form a leak-free interface between the first and second passages; and
   means for introducing relative movement between the seal plate and the seal body to align the first and second openings in a first valve opened position and to block the second opening with the first sealing surface in a second valve closed position.

* * * * *

UNITED STATES PATENT AND TRADEMARK OFFICE
CERTIFICATE OF CORRECTION

PATENT NO. : 5,862,833
DATED : January 26, 1999
INVENTOR(S) : Frederick W. Perez It is certified that error appears in the above-identified patent and that said Letters Patent is hereby corrected as shown below:

Column 4, line 9, replace "a" with -- an --.
Column 4, line 45, change "and a" to -- and an --.
Column 5, lines 42-59, on line 42 delete the text beginning with "In a preferred embodiment..." through "... greatly with increased coolant pressure." on line 59.
Column 6, line 14, replace "resistance" with -- resistant --.
Column 6, line 45, replace "claim 2" with -- claim 1 --.
Column 6, line 56, replace "claim 1" with -- claim 3 --.
Column 6, line 60, replace "claim 1" with -- claim 3 --.
Column 7, line 1, replace "claim 5" with -- claim 1 --.
Column 7, line 5, replace "claim 5" with -- claim 1 --.
Column 7, line 26, replace "claim 1" with-- claim 9 --.
Column 7, line 61, replace "claim 11" with -- claim 13 --.
Column 8, line 22, replace "claim 15" with -- claim 1 --.
Column 8, line 25, replace "claim 15" with -- claim 9 --.
Column 8, line 28, replace "claim 15" with -- claim 13 --.

Signed and Sealed this

Twenty-second Day of February, 2000

Attest:

Q. TODD DICKINSON

Attesting Officer                Commissioner of Patents and Trademarks